(12) United States Patent
Shukla et al.

(10) Patent No.: US 8,582,035 B2
(45) Date of Patent: Nov. 12, 2013

(54) APPARATUS, SYSTEMS AND METHODS UTILIZING ADJACENT-CHANNEL POWER DEPENDENT AUTOMATIC GAIN CONTROL FOR DIGITAL TELEVISION DEMODULATION

(75) Inventors: Parveen K Shukla, Nottingham (GB); Bernard Arambepola, Enfield (GB); Thushara Hewavithana, Borhamwood (GB); Sahan S Gamage, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 13/032,079

(22) Filed: Feb. 22, 2011

(65) Prior Publication Data

US 2012/0212675 A1 Aug. 23, 2012

(51) Int. Cl.
H04N 5/52 (2006.01)

(52) U.S. Cl.
USPC ............ 348/678; 348/68; 348/725; 348/470; 348/671; 348/707; 348/572; 375/345; 375/360; 455/234; 455/253; 455/296

(58) Field of Classification Search
USPC ................ 348/678, 725, 470, 671, 707, 572; 455/234, 253, 296; 375/360, 345
See application file for complete search history.

(56) References Cited

U.S. PATENT DOCUMENTS

| | | | |
|---|---|---|---|
| 6,046,781 A * | 4/2000 | LeRoy | 348/731 |
| 6,389,273 B1 * | 5/2002 | Brandenburg | 455/296 |
| 6,731,703 B2 * | 5/2004 | Kurihara | 375/345 |
| 7,317,493 B1 * | 1/2008 | Hutchinson et al. | 348/678 |
| 7,710,503 B2 * | 5/2010 | Pugel et al. | 348/731 |
| 8,184,206 B2 * | 5/2012 | Magnusen | 348/678 |
| 2005/0130617 A1 * | 6/2005 | Burns et al. | 455/253.2 |
| 2006/0003716 A1 | 1/2006 | Hayashihara | |
| 2007/0105515 A1 * | 5/2007 | Muterspaugh et al. | 455/234.1 |
| 2008/0101517 A1 * | 5/2008 | Haider et al. | 375/360 |
| 2009/0086859 A1 * | 4/2009 | Okuma et al. | 375/345 |
| 2010/0073572 A1 * | 3/2010 | Burns et al. | 348/707 |
| 2010/0219887 A1 | 9/2010 | Ichitsubo et al. | |
| 2010/0238358 A1 * | 9/2010 | Ma et al. | 348/725 |

FOREIGN PATENT DOCUMENTS

| | | |
|---|---|---|
| JP | 2009-212951 A | 9/2009 |
| JP | 2009-267653 A | 11/2009 |
| WO | 2012/115805 A2 | 8/2012 |
| WO | 2012/115805 A3 | 11/2012 |

OTHER PUBLICATIONS

International Search Report and Written Opinion for PCT Patent Application No. PCT/US2012/024711, mailed on Sep. 24, 2012, 8 pages.

* cited by examiner

*Primary Examiner* — Jefferey Harold
*Assistant Examiner* — Mustafizur Rahman
(74) *Attorney, Agent, or Firm* — Ellis B. Ramirez; Prass LLP

(57) ABSTRACT

An embodiment of the present invention provides a method for digital television demodulation, comprising using adjacent-channel power dependent automatic gain control (AGC) for the digital television demodulation, wherein an AGC technique takes into account a total power as well as power of adjacent channels to control gain of a gain control amplifier.

25 Claims, 2 Drawing Sheets

APPARATUS, SYSTEMS AND METHODS UTILIZING ADJACENT-CHANNEL POWER DEPENDENT AUTOMATIC GAIN CONTROL FOR DIGITAL TELEVISION DEMODULATION

BACKGROUND

In digital TV, the power levels of channels that are adjacent to the wanted channel can be 30 dB to 40 dB higher than the wanted channel. Part of this power is removed by the tuner, yet a significant part of this appears at the input of the analog to digital (A/D) converter (ADC) of the digital demodulator. The automatic gain control circuit has to adjust the power level of this composite (wanted+adjacent) signal at the input of the ADC to get optimum receiver performance.

In emerging DTV standards, a channel may be time-multiplexed between different services. For example, in DVB-T2 there are Future Extension Frames (FEFs) which are intended to carry other services. Although not limited in this respect, one such service already identified is the signaling for transmitter identification. The power levels of different services may not be the same.

Hence in DVB-T2, the power level of FEFs may well be different from that of other frames. Although this is not a problem with current systems, it is a problem that is likely to occur in the future when DVB-T2 type transmissions with multiple services are widely adopted.

Thus, a critical need is prevalent for apparatus, systems and methods that enable DTV demodulators to overcome this potential problem.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
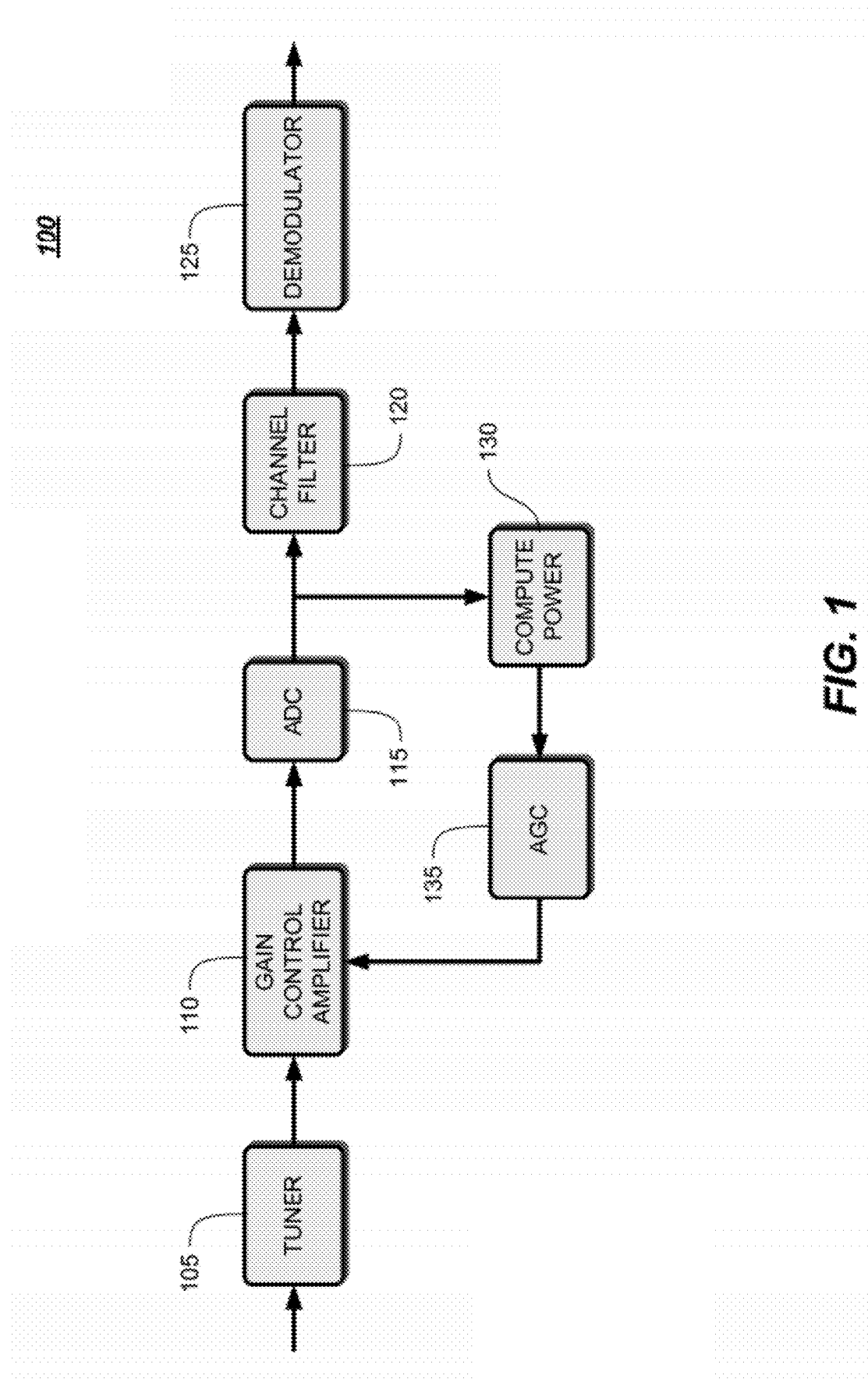
FIG. 1 illustrates a conventional AGC Control Architecture.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

All known automatic gain control (AGC) circuits in digital television (DTV) receivers adopt the approach given in FIG. 1, because in current DTV systems the ACI power levels do not change that frequently. Power levels may change slowly over long time periods and then the AGC circuits adapts for these changes. In future systems employing standards like DVB-T2 with multiple services, the ACI power levels can change quite frequently because of Future Extension Frames (FEFs) allocated for other services. In such systems if the conventional method in FIG. 1 is adopted, the AGC will amplitude modulate the wanted channel and thereby reduce performance.

Embodiments of the present invention provide AGC techniques, including but not limited to an AGC circuit, that takes into account the total power as well as the power of the adjacent channels (ACI power) to control the gain of the gain control amplifier. This enables DTV receivers of embodiments of the present invention to work in an optimum way in any future DVB-T2 based system. Although embodiments of the present invention are illustrated herein using DVB-T2, the present invention is applicable to other Digital TV systems as well and thus the present invention is not limited to DVB-T2.

Assume that the wanted channel is a DVB-T (or even a DVB-T2) channel. One may consider a scenario in which a DVB-T2 channel with multiple services (implemented via FEF) happens to be adjacent to the wanted channel. The power level in the adjacent channel will then vary frequently with time and hence the total power at the input to the ADC will also vary unpredictably with time. The AGC will attempt to keep this total power level at the specified target value by adjusting amplifier gain. In doing so it will inadvertently amplitude modulate the wanted channel, leading to loss of performance.

Looking now at the figures, FIG. 1, shown generally as 100, shows the automatic gain control circuit of a conventional receiver. Tuner is shown at 105 which is output to Gain Control Amplifier 110, which provides input for analogue to digital converter (ADC). Power level is measured at 130 at the output of the ADC 115 and adjusts the gain 135 of the amplifier 110 preceding the ADC to give optimum ADC performance and providing input to channel filter 120, the output of which is sent to demodulator 125.

Figure 2:
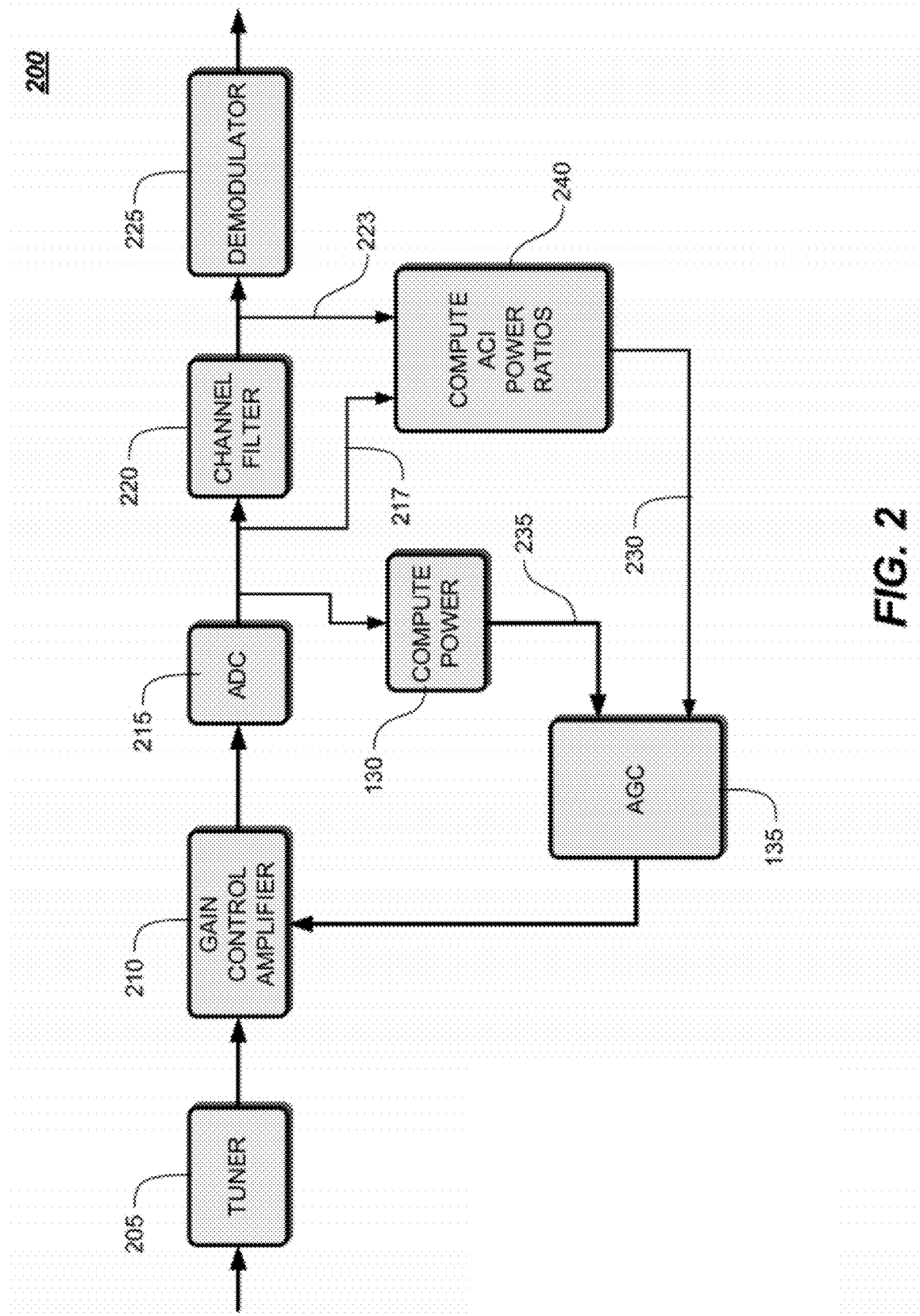
FIG. 2 shows a new AGC Control Architecture according to embodiments of the present invention.

FIG. 2 at 200, illustrates the new automatic gain control circuit provided in embodiments of the present invention. It may have two inputs. A first input is a power level 235 at the output of the ADC, which may be similar to conventional AGC circuits. A second input 230, distinct from previous art and unique to embodiments of the present invention, is the power level of the adjacent channels only. The output of AGC 135 is used to control the gain of gain control amplifier 210. At 240 ACI power rations are computed.

The operation of the conventional AGC circuit is known to those of ordinary skill in the art and is thus not described in any significant detail herein, but may comprise the following main components: a circuit for working out the difference (or error) between the received power and the target power level, an adjustable gain to be applied to this error to control the loop bandwidth or response time, a logarithmic non-linearity and a loop filter comprising an accumulator (integrator).

In many applications, the amplitude probability density function may be assumed Gaussian (via Central Limit Theorem). Then setting the standard deviation (i.e. square-root of the target) to about 25% of the peak ADC value will ensure a clipping probability of about 1e−5 which may be considered acceptable for most digital TV (DTV) applications.

A key new feature of the new AGC provided in embodiments of the present invention is that it responds to the composite power as well as to the residual power of the adjacent channel. In DTV applications the adjacent channel power may be +40 dB and the filters 220 in the tuner often do not provide stop band attenuation greater than 40 dB. Hence the residual power of the Adjacent Channel Interference (ACI) seen by the demodulator ADC 215 may well be equal to or higher than the wanted channel. There are also situations in which a fixed-bandwidth (8 MHz) tuner 205 has to support 6, 7 and 8 MHz bandwidth DTV. Then for 6 and 7 MHz DTV the ACI power seen by the demodulator 225 will be much higher than that of the wanted channel. There is a digital channel filter 220 in the digital front-end of the demodulator 225 to filter out the ACI and to isolate the wanted channel.

Assume that the adjacent channel is a DVB-T2 channel. The DVB-T2 standard allows non DVB-T2 frames to be interspersed within the DVB-T2 frame structure. These are called Future Extension Frames (FEFs) and are intended for use by other services in the future. One such service already planned is transmitter identification. It is likely that in the future DVB-T2 channels will be time-shared with other services through the use of FEFs.

There is no guarantee that the power of FEF will be the same as any other DVB-T2 frame in the same transmission. If the FEF is part of the wanted channel, then the receiver will precisely know the location of this from signaling parameters and hence can easily take preventative action. However, this is not the case if the DVB-T2 transmission with FEFs happens to be an adjacent channel. Then there could be significant and relatively frequent fluctuations in the total power (wanted plus adjacent channel power). The conventional AGC circuit in FIG. 1 will respond to this total power and try to keep this total power at the target level. To do this it will adjust the gain of the amplifier 110 shown in FIG. 1. The net effect of this is that the wanted channel will be subjected to undesirable amplitude changes due to the fluctuations of the power levels of adjacent channels.

Embodiments of the present invention provide an algorithm shown in FIG. 2 wherein the present invention taps off the input 217 and the output 223 of the above mentioned digital channel filter 220 and use these to measure the residual power of the adjacent channels. The power at the input 217 of the channel filter 220 is the total power, which is the sum of the wanted and ACI power. The power at the output of the channel filter 220 is the wanted power level only. Hence the ACI_Power_Ratio is given by the following equation:

$$\text{ACI\_Power\_Ratio} = \frac{\text{Channel\_Filter\_Input\_Power}}{\text{Channel\_Filter\_Output\_Power}} - 1 \quad (1)$$

Two values of ACI_Power_Ratio are computed:

1. ACI_Power_Ratio_Long_Term: This is the above equation computed with channel filter input 217 and output 223 powers averaged over a relatively long period. Furthermore, this is made to be representative of the signal when it has "normal" ACI, i.e. no FEFs, by disabling this averaging during short term power fluctuations, as described below.

2. ACI Power_Ratio_Short_Term: This is the above equation computed with channel filter input 217 and output 223 powers averaged over a relatively short period. Under normal operation, the short term ACI power ratio will be approximately equal to the long term ACI power ratio. However, if there are DVB-T2 FEFs with higher power level then during these FEFs, the short term ACI power ratio will be greater than the long term ACI power ratio. Conversely, lower power FEFs will cause the short term ACI power ratio to be smaller than the long term one.

It is necessary to set the AGC target such that the clipping probability is kept below a predefined value (e.g. although not limited to, 1e−5) even in the presence of high power FEF ACI. Initially this value of high power FEF ACI may not be known and hence the AGC target is set to a low value based on a worst case assumption so that the ADC does not clip even in the presence of the highest power ACI FEFs. This will increase the quantization noise of the ADC and hence embodiments of the present invention provide a mechanism of gradually adapting the target to the observed high-power FEF ACI levels during the tracking stage of the demodulator to obtain the best performance from the ADC. Then, the present invention may detect sudden decreases or increases in the ACI power level using the following equations:

$$\frac{\text{ACI\_Power\_Ratio\_Short\_Term}}{\text{ACI\_Power\_Ratio\_Long\_Term}} < \text{Threshold\_1} \quad (2)$$

$$\frac{\text{ACI\_Power\_Ratio\_Short\_Term}}{\text{ACI\_Power\_Ratio\_Long\_Term}} > \text{Threshold\_2} \quad (3)$$

Here Threshold_1<1 and Threshold_2>1.

If a decrease or increase of the ACI power causes a threshold crossing in accordance with the equations (2) or (3) then the AGC updates are disabled, i.e. the AGC is frozen. Furthermore, the long-term power average is frozen so that the long term averages remain unaffected by short term changes in the ACI power level. By disabling or freezing the AGC when there are sudden changes in the ACI power level, the present invention reduces the extent to which the wanted signal is amplified or attenuated during these ACI FEF periods. This enables the receiver to work with minimum disruption during FEF or power fluctuation periods of adjacent channels.

It is necessary to account for the fact that these changes in ACI power level may not be caused by FEFs, but by other factors. In other words, the short term changes may well not be short term and these changes may be there to stay. Hence if the AGC is frozen for more than a certain pre-defined time limit, then a timeout is deemed to have occurred and the AGC is released from its from its frozen state. At the same time, the long-term average is initialized to the short-term average and allowed to adapt as normal again. An FEF has a maximum time duration of 250 ms, so this gives a method of working out the above timeout period. It is understood that the present invention is not limited to any particular durations of FEFs.

Finally, embodiments of the present invention take into consideration automatic AGC target adaption. It has been noted that the initial AGC target has been set assuming a worst case ACI FEF level. This is to ensure that the ADC does not clip when this ACI FEF power level occurs. The relatively low AGC target value needed to cope with this worst case scenario could result in relatively poor ADC performance (i.e. increased quantization noise) since the full range of the ADC is not utilized. However, this is needed to get the system into the tracking phase.

Once the system is in the tracking phase, the maximum of the actual short term ACI power ratio is monitored over a relatively long period. The optimum AGC target setting is a function of this.

$$AGC\_Target\_Optimum = f(\max(ACI\_Power\_Ratio\_Short\_Term)) \quad (4)$$

The above function can be derived from assuming a Gaussian probability density function for the input signal amplitude. Then the AGC target setting is updated to the optimum value. A step update will result in a disturbance to the DTV receiver system. Hence a gradual update in very small steps is made to the target over a period of time so that at the end of this period the target is optimum. The receiver continues to monitor maximum value of short term ACI power level so that further adaptations can be made if there are further changes. The system utilizing embodiments of the present invention has been simulated with a complete transmit and receiver model and has been shown to function well. It has also been shown that when the present invention is not used, changes in ACI power levels due to FEFs in adjacent DVB-T2 channels result in bursts of uncorrectable MPEG packets.

Embodiments of the present invention may further provide a non-volatile computer readable medium encoded with computer executable instructions, which when accessed, cause a machine to perform operations comprising, controlling digital television demodulation by using adjacent-channel power dependent automatic gain control (AGC) for the digital television demodulation, wherein an AGC technique takes into account a total power as well as power of adjacent channels to control gain of a gain control amplifier.

Also, embodiments of the present invention may provide a system, comprising a digital television transmitter, a digital television receiver adapted for communication with the digital television transmitter, and the digital television receiver, comprising a demodulator adapted to use adjacent-channel power dependent automatic gain control (AGC) for digital television demodulation, wherein an AGC technique takes into account a total power as well as power of adjacent channels to control gain of a gain control amplifier.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method for digital television demodulation, comprising:
   using adjacent-channel power dependent automatic gain control (AGC) for said digital television demodulation, wherein an AGC technique takes into account a total power as well as power of adjacent channels to control gain of a gain control amplifier;
   wherein said power at an output of a channel filter is a wanted power level only and an ACI Power Ratio is given by ACI Power Ratio = (Channel_Filter_Input_Power ÷ Channel_Filter_Output_Power) − 1;

wherein two values of said ACI_Power_Ratio are computed:
   ACI_Power_Ratio_Long_Term, wherein said ACI_Power_Ratio computed with Channel filter input and output powers are averaged over a long period; and
   ACI_Power_Ratio Short_Term, wherein said ACI_Power_Ratio computed with Channel filter input and output powers are averaged over a short period;
   wherein the short period is less than the long period;
   wherein the long period has a maximum time duration of 250 ms.

2. The method of claim 1, further comprising tapping off an input and an output of a digital channel filter and using these to measure a residual power of adjacent channels.

3. The method of claim 1, wherein power at said input of said channel filter is a total power, which is a sum of wanted and Adjacent Channel Interference (ACI) power.

4. The method of claim 1, wherein said AGC responds to composite power as well as to residual power of said adjacent channel.

5. The method of claim 1, wherein under normal operation, said short term ACI power ratio will be approximately equal to said long term ACI power ratio; however, if there are Digital Video Broadcasting (DVB-T2) Future Extension Frames (FEFs) with higher power level then during said FEFs, said the short term ACI power ratio will be greater than said long term ACI power ratio and wherein lower power FEFs will cause said short term ACI power ratio to be smaller than said long term ACI power ratio.

6. The method of claim 5, further comprising setting an AGC target such that a clipping probability is kept below a predefined value even in a presence of a high power FEF ACI and wherein initially said predefined value of high power FEF ACI may not be known and hence said AGC target is set to a low value based on a worst case assumption so that said ADC does not clip even in the presence of a highest power ACI FEFs.

7. The method of claim 6, further comprising detecting sudden decreases or increases in an ACI power level using two predetermined Thresholds, Threshold_1 and Threshold_2, with Threshold_<1 and Threshold_2>1 and if a decrease or increase of said ACI power causes a threshold crossing, then said AGC updates are disabled said long-term power average is frozen so that said long term averages remain unaffected by short term changes in said ACI power level, and wherein by disabling or freezing said AGC when there are sudden changes in said ACI power level an extent to which a wanted signal is amplified or attenuated is reduced during said ACI FEF periods, thereby enabling a receiver to work with minimum disruption during FEF or power fluctuation periods of adjacent channels.

8. The method of claim 7, wherein to account for a fact that changes in ACI power level may not be caused by FEFs, if said AGC is frozen for more than a pre-defined time limit, then a timeout is deemed to have occurred and said AGC is released from its from its frozen state and wherein at a same time, said long-term average is initialized to said short-term average and allowed to adapt as normal again.

9. The method of claim 8, further comprising using automatic AGC target adaption, wherein an initial AGC target has been set assuming a worst case ACI FEF level to ensure that said AGC does not clip when said ACI FEF power level occurs and once in a tracking phase, a maximum of an actual short term ACI power ratio is monitored over a relatively long period and then said AGC target setting is updated to an optimum value and wherein a gradual update with very small steps is made to said target over a period of time so that at the end of said period said target is optimum without a disturbance to a DTV receiver system.

10. A digital television receiver, comprising:
a demodulator adapted to use adjacent-channel power dependent automatic gain control (AGC) for digital television demodulation, wherein an AGC technique takes into account a total power as well as power of adjacent channels to control gain of a gain control amplifier;
wherein power at an input of a channel filter is a total power, which is a sum of wanted and Adjacent Channel Interference (ACI) power;
wherein said power at an output of said channel filter is a wanted power level only and an ACI Power Ratio is given by ACI Power Ratio =(Channel_Filter_Input_Power ±Channel_Filter_Output_Power)−1;

wherein two values of said ACI_Power_Ratio are computed:
ACI_Power_Ratio_Long_Term, wherein said ACI_Power_Ratio computed with Channel filter input and output powers are averaged over a long period; and
ACI_Power_Ratio_Short_Term, wherein said ACI_Power_Ratio computed with Channel filter input and output powers are averaged over a short period;
wherein the short period is less than the long period;
wherein the long period has a maximum time duration of 250 ms.

11. The digital television receiver of claim 10, wherein said demodulator is capable of tapping off an input and an output of a digital channel filter and using these to measure a residual power of adjacent channels.

12. The digital television receiver of claim 10, wherein said AGC responds to composite power as well as to residual power of said adjacent channel.

13. The digital television receiver of claim 10, wherein under normal operation said short term ACI power ratio will be approximately equal to said long term ACI power ratio; however, if there are Digital Video Broadcasting (DVB-T2) Future Extension Frames (FEFs) with higher power level then during said FEFs, said the short term ACI power ratio will be greater than said long term ACI power ratio and wherein lower power FEFs will cause said short term ACI power ratio to be smaller than said long term ACI power ratio.

14. The digital television receiver of claim 13, wherein said demodulator sets an AGC target such that a clipping probability is kept below a predefined value even in a presence of a high power FEF ACI and wherein initially said predefined value of high power FEF ACI may not be known and hence said AGC target is set to a low value based on a worst case assumption so that said ADC does not clip even in the presence of a highest power ACI FEFs.

15. The digital television receiver of claim 10, wherein said demodulator detects sudden decreases or increases in an ACI power level using two predetermined Thresholds, Threshold_1 and Threshold_2, with Threshold_1<1 and Threshold_2>1 and if a decrease or increase of said ACI power causes a threshold crossing, then said AGC updates are disabled said long-term power average is frozen so that said long term averages remain unaffected by short term changes in said ACI power level, and wherein by disabling or freezing said AGC when there are sudden changes in said ACI power level an extent to which a wanted signal is amplified or attenuated is reduced during said ACI FEF periods, thereby enabling a receiver to work with minimum disruption during FEF or power fluctuation periods of adjacent channels.

16. The digital television receiver of claim 15, wherein to account for a fact that changes in ACI power level may not be caused by FEFs, if said AGC is frozen for more than a predefined time limit, then a timeout is deemed to have occurred and said AGC is released from its from its frozen state and wherein at a same time said long-term average is initialized to said short-term average and allowed to adapt as normal again.

17. The digital television receiver of claim 16, wherein said demodulator uses automatic AGC target adaption, wherein an initial AGC target has been set assuming a worst case ACI FEF level to ensure that said AGC does not clip when said ACI FEF power level occurs and once in a tracking phase, a maximum of an actual short term ACI power ratio is monitored over a relatively long period and then said AGC target setting is updated to an optimum value and wherein a gradual update with very small steps is made to said target over a period of time so that at the end of said period said target is optimum without a disturbance to a DTV receiver system.

18. A non-transitory computer readable medium encoded with computer executable instructions, which when accessed, cause a machine to perform operations comprising:
controlling digital television demodulation by using adjacent-channel power dependent automatic gain control (AGC) for said digital television demodulation, wherein an AGC technique takes into account a total power as well as power of adjacent channels to control gain of a gain control amplifier;
tapping off an input and an output of a digital channel filter and using these to measure a residual power of adjacent channels;
wherein said power at said output of said digital channel filter is a wanted power level only and an ACI Power Ratio is given by ACI Power Ratio =(Channel_Filter_Input_Power ±Channel_Filter_Output_Power)−1;

wherein said ACI_Power_Ratio computed with Channel filter input and output powers are averaged over a long period; and ACI_Power_Ratio_Short_Term, wherein said ACI_Power_Ratio computed with Channel filter input and output powers are averaged over a short period;
wherein the short period is less than the long period;
wherein the long period has a maximum time duration of 250 ms.

19. The non-transitory computer readable medium encoded with computer executable instructions of claim 18, wherein said AGC responds to composite power as well as to residual power of said adjacent channel.

20. The non-transitory computer readable medium encoded with computer executable instructions of claim 19, wherein under normal operation said short term ACI power ratio will be approximately equal to said long term ACI power ratio; however, if there are Digital Video Broadcasting (DVB-T2) Future Extension Frames (FEFs) with higher power level then during said FEFs, said the short term ACI power ratio will be greater than said long term ACI power ratio and wherein lower power FEFs will cause said short term ACI power ratio to be smaller than said long term ACI power ratio.

21. The non-transitory computer readable medium encoded with computer executable instructions of claim 20, further comprising setting an AGC target such that a clipping probability is kept below a predefined value even in a presence of a high power FEF ACI and wherein initially said predefined value of high power FEF ACI may not be known and hence said AGC target is set to a low value based on a worst case assumption so that said ADC does not clip even in the presence of a highest power ACI FEFs.

22. The non-transitory computer readable medium encoded with computer executable instructions of claim 21, further comprising detecting sudden decreases or increases in an ACI power level using two predetermined Thresholds, Threshold_1 and Threshold_2, with Threshold_1<1 and Threshold_2>1 and if a decrease or increase of said ACI power causes a threshold crossing, then said AGC updates are disabled said long-term power average is frozen so that said long term averages remain unaffected by short term changes in said ACI power level, and wherein by disabling or freezing said AGC when there are sudden changes in said ACI power level an extent to which a wanted signal is amplified or attenuated is reduced during said ACI FEF periods, thereby enabling a receiver to work with minimum disruption during FEF or power fluctuation periods of adjacent channels.

23. A system, comprising:
a digital television transmitter;
a digital television receiver adapted for communication with said digital television transmitter, said digital television receiver, comprising:
a demodulator adapted to use adjacent-channel power dependent automatic gain control (AGC) for digital television demodulation, wherein an AGC technique takes into account a total power as well as power of adjacent channels to control gain of a gain control amplifier;
wherein power at an output of a channel filter is a wanted power level only and an ACI Power Ratio is given by $$\text{ACI Power Ratio} = (\text{Channel\_Filter\_Input\_Power} \pm \text{Channel\_Filter\_Output\_Power}) - 1;$$

wherein two values of said ACI_Power_Ratio are computed:
ACI_Power_Ratio_Long_Term, wherein said ACI_Power_Ratio computed with Channel filter input and output powers are averaged over a long period; and
ACI_Power_Ratio_Short_Term, wherein said ACI_Power_Ratio computed with Channel filter input and output powers are averaged over a short period;
wherein the short period is less than the long period;
wherein the long period has a maximum time duration of 250 ms.

24. The system of claim 23, wherein said demodulator is capable of tapping off an input and an output of a digital channel filter and using these to measure a residual power of adjacent channels.

25. The system of claim 24, wherein power at said input of said channel filter is a total power, which is a sum of wanted and Adjacent Channel Interference (ACI) power.

* * * * *